3,167,602
METHOD OF ENCAPSULATING LIQUID PARTICLES IN THERMOPLASTIC SHELL
Itzhak Bentov, Belmont, and Robert M. Jolkovski, Boston, Mass., assignors, by mesne assignments, of fifty percent to Delavan Manufacturing Company, West Des Moines, Iowa, a corporation of Iowa, and fifty percent to The Aro Corporation, Bryan, Ohio, a corporation of Ohio
Filed Mar. 12, 1962, Ser. No. 179,031
7 Claims. (Cl. 264—4)

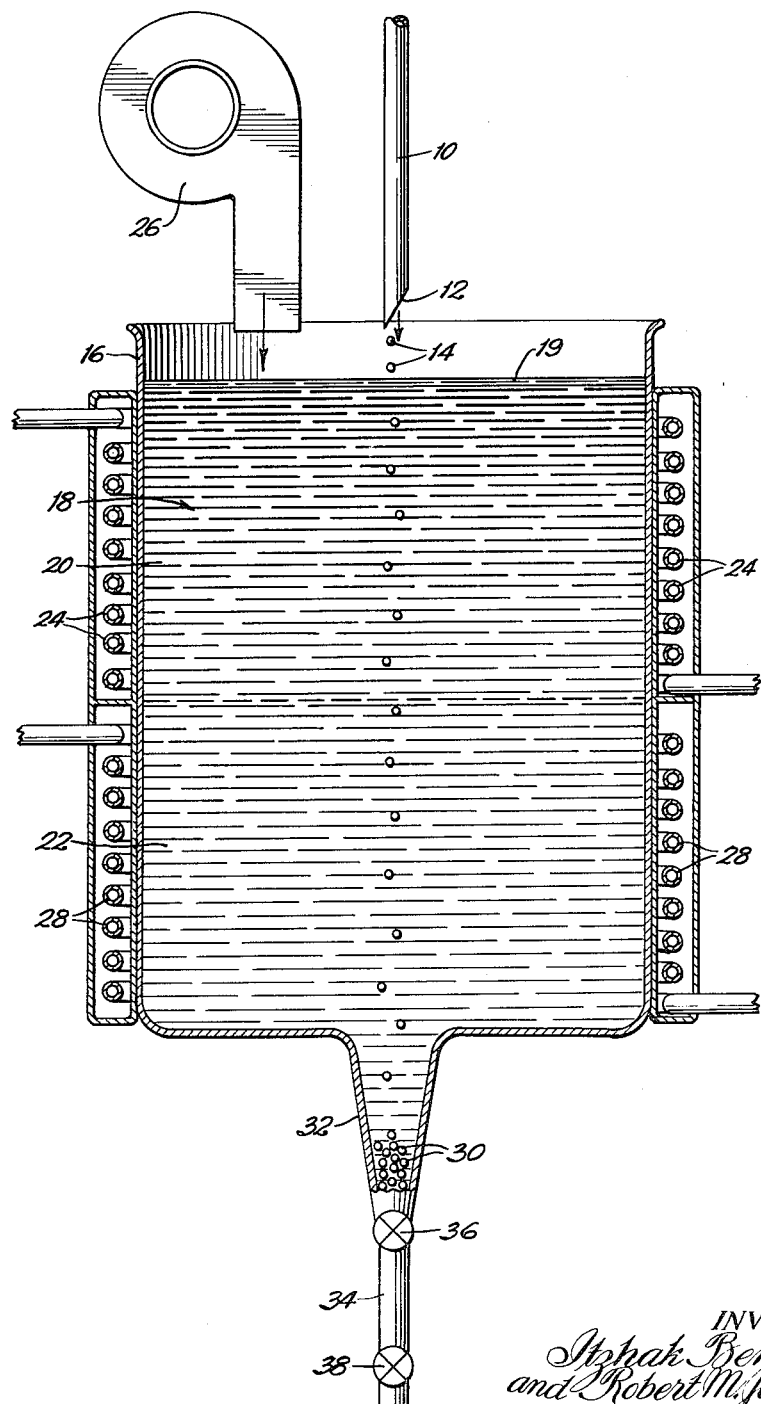

The present invention relates to a method for encapsulating particles in a protective thermoplastic shell and more particularly to a method for encapsulating minute particles of liquid in premeasured quantities. The invention finds use for packaging liquid curing agents for synthetic resins to prevent reaction between the curing agent and resin carrier or the like through which they are dispersed, until such time as it is desired to initiate the curing or hardening reaction. The invention is also useful in capsulating pharmaceuticals and medicinal preparations; liquid solvents for adhesives; reactive chemicals, such as photographic developers; glues and adhesives; corrosive liquids which are difficult to handle in liquid form.

Briefly, the coating is formed by discharging particles of the material to be coated into a vessel containing a molten thermoplastic coating layer floating above a body of cooling liquid. The particles become completely enclosed within a thermoplastic shell as they pass through the thermoplastic coating layer. The shell is then solidified as the coated particles pass across the interface into the body of cooling liquid lying beneath the molten layer of coating material.

It is, therefore, a primary object of this invention to provide a unique method for continuously encapsulating minute liquid particles in a solid protective coating to form a frangible capsule.

Another object is to provide a method which utilizes the kinetic energy of a falling droplet to cause it to pass through a molten layer of thermoplastic coating material and through the interface into a cooling bath beneath, thereby hardening the coating of the thermoplastic material applied.

Another object is to provide a simple apparatus for practicing the method of the invention in which the thermoplastic shell-forming material is maintained in the molten state by floating a layer thereof on a heated liquid bath which overlies a cooling bath for hardening the shell.

These and other objects and advantages of the invention will become apparent from the following description when read in conjunction with the accompanying drawing. The single figure of the drawing illustrates schematically an apparatus suitable for carrying out the process of the invention.

The coating composition may be a thermoplastic resin having a relatively low viscosity at its melting point, a wax, or a mixture of the two. Polyethylene has been found to be highly suitable for use as a coating material for amine liquids normally used as hardening agents for epoxy resins. Other thermoplastics will occur to those skilled in the art, the particular choice depending in large part upon the properties of the material being encapsulated. The liquid bath on which the thermoplastic coating material floats should of course be immiscible with the coating material and of higher specific gravity. Water has been found suitable for most materials. If the coating material is water soluble then of course an organic solvent having a specific gravity greater than that of water should be used as the underlying bath. The surface of the bath which supports the molten thermoplastic material preferably should be maintained at a sufficiently high temperature to keep the material molten. Additional heat may be supplied from above the molten layers. The cooling zone of the liquid bath which is spaced below the surface supporting the molten thermoplastic layer is maintained at a temperature substantially below the melting point of the thermoplastic resin. A single bath having a temperature gradient, hot at the top and cool at the bottom, is satisfactory. The encapsulated product upon entering the cool zone is cooled to solidify the external shell.

In a preferred form of the invention the liquid droplets are heated so that they will contract with the hot thermoplastic shell as the encapsulated droplet passes into the cooling zone. If the contained liquid is of lower temperature than the thermoplastic coating it does not contract, or contracts much less than the shell. In such circumstances the liquid droplet may force a capillary through the coating at the tail of the capsule, or produce a weak spot, thus spoiling the integrity of the shell. When this condition prevails, heating of the liquid before it is discharged into the molten coating layer is sufficient to obviate the problem since the droplet shrinks with the coating.

The thickness of the film of molten thermoplastic material should not be any thicker than required to provide a complete enclosure for the particles passing therethrough. It is desirable to minimize the resistance to the movement of the particles through the molten layer. In most instances a thickness of 3 to 4 mils has been found to be satisfactory. The quality of the product is also determined by the kinetic energy of the particle which is discharged from a point above the molten layer through which it falls. The kinetic energy, which is a function of the mass and the velocity of the particle, must be great enough to cause the particle to penetrate the molten layer and the interface between the molten layer and the surface of the bath which interface provides increased resistance as compared with the molten layer. The kinetic energy, however, should not be great enough to cause the particles to splash as they hit the liquid nor to cause the particles to break up upon impact. The particles must pass intact through the molten layer and the interface with the supporting bath. It is also important that the specific gravity of the liquid bath be less than the specific gravity of the encapsulated particles so that the particles will travel downwardly into the cooler zone by gravity.

Referring now to the drawing, a tube 10 having a nozzle 12 at its lower end is shown for discharging liquid droplets 14 or other particles which are to be encapsulated. The droplet size is controlled within a desired range up to about ⅛" diameter in any well known manner, and upon discharge from the nozzle the droplets are allowed to fall under the influence of gravity. The tube 10 may be made vertically adjustable to regulate the distance through which the droplets fall and thus control the kinetic energy of the particle as it hits the surface of the molten thermoplastic coating layer. Although the apparatus shown in the drawing causes the droplets to fall freely under the influence of gravity, the kinetic energy may be increased by discharging from a nozzle under air pressure or by entraining the droplets in an air stream. Although only one tube is shown in the drawing, it will be understood that in a production apparatus a multiplicity of tubes may be employed in accordance with the quantity of material to be capsulated.

A vessel 16 containing a water bath 18 having a layer 19 of thermoplastic coating material, e.g., molten wax, floating on the upper surface thereof is disposed beneath the falling particles 14. The wax may be modified by adding a low molecular weight polyethylene to improve the impermeability of the shell and increase its toughness.

The additive should not materially increase the viscosity of the coating. The water bath 18 is maintained in two nondistinct zones 20 and 22 of different temperature. The surface of the upper zone 20 is maintained at a temperature of 150° F. by means of hot water which is circulated through the coils 24. The temperature, of course, will vary depending upon the particular melting point of the thermoplastic coating material being used. It will also be understood that there is a temperature gradient from the surface on which the molten material floats extending downwardly into the cooling zone 22. Cold water circulated through the coils 28 maintains the cooling zone at approximately room temperature.

A hot air blower 26 may supplement the heat imparted to the layer 19 by the bath 20 to maintain the layer 19 in molten condition. The thickness of the layer 19 may range between ½ and 4 mils and preferably between 3 and 4 mils in the particular system described.

The falling droplets having a diameter of say ⅛" pass through the low viscosity layer 19 of molten wax to acquire a coating of from 2 to 3 mils in thickness. As the capsules thus formed pass through the lower layer 22, the coating is progressively cooled and in effect frozen around the particles. Preferably the particles which are discharged from the nozzle 12 are maintained at an elevated temperature equivalent to the temperature of the layer 19. This prevents the droplets which are falling into the molten layer to cool that layer and thus modify its viscosity.

It is also important that the droplets be dropped from a distance above the bath so as to acquire sufficient kinetic energy for penetration of the layer 19 and the interfacial layer between the molten layer and the supporting surface of the bath. In the apparatus illustrated in the drawing and using the materials specified, we have found that a distance ranging from 1½" to 2" is effective for particles having a mean diameter of about ⅛".

As the cooled coated particles indicated at 30 fall to the bottom of the vessel 16, they are collected in a well 32. The well 32 has a tube 34 extending therefrom and closed by a pair of tandemly arranged valves 36 and 38 so that the coated particles 30 may be removed from the vessel without excessive loss of the liquid contents.

It will be understood that various modifications can be made in the method and apparatus described herein without departing from the basic invention. For example, the wax or other coating material may contain a polymerizing agent for the particles which are being coated. We have found that where a liquid amine is being encapsulated, an acid chloride may be added to the wax layer. The acid chloride reacts with the amine to polymerize the surface thereof and in this way provide protection in addition to that furnished by the thermoplastic shell.

We have found that amines coated with wax in accordance with the specific example recited in this specification will have a shell thickness ranging from through 2 to 3 mils on particles of about ⅛" diameter. This protective shell has also been found effective to protect the amine when it was dispersed in a liquid epoxy resin. The epoxy resin was found not to thicken or harden after standing on the shelf for several weeks. When the epoxy resin containing the capsules is sprayed at elevated temperature the thermoplastic shells melt and dissolve in the epoxy resin so that there is no residue dispersed in the resin. If the reaction proceeds at room temperature, the tiny shells are left dispersed throughout the resin mass. This is not detrimental unless the resin must have a certain transparency for special applications.

We claim:
1. A method for encapsulating liquid particles in a protective shell of thermoplastic material which comprises providing a thin molten layer of said thermoplastic material supported by a bath having a specific gravity higher than the specific gravity of said thermoplastic material, which bath is maintained at a temperature above the melting point of said thermoplastic material at its upper surface and at a temperature below the melting point of said thermoplastic material in a cooling zone below said upper surface, discharging said liquid particles from a point above said molten layer under the influence of gravity so that they strike said molten layer with sufficient kinetic energy to pass intact through said layer and into said cooling zone, whereby said particles become encapsulated in a thin solid protective shell of thermoplastic material.

2. A method for encapsulating liquid particles in a protective shell of thermoplastic material which comprises providing a thin molten layer of said thermoplastic material not more than about 4 mils thick, causing said particles to be discharged from a point above said layer with sufficient force to pass intact through said layer without splashing upon impact, thereby completely encapsulating said particles in a shell of said thermoplastic material, and cooling said particles to harden said thermoplastic shell.

3. A method for encapsulating liquid droplets in a protective shell of thermoplastic material which comprises floating a thin layer of molten thermoplastic material ranging from ½ to 4 mils in thickness on a liquid bath having a specific gravity less than the specific gravity of said liquid droplets and greater than the specific gravity of said thermoplastic material, maintaining the upper surface of said bath at a temperature which keeps the thermoplastic material molten and the lower zone of said bath spaced below said thermoplastic layer at a temperature below the solidification point of said thermoplastic material, causing said liquid droplets of less than ⅛" diameter to fall under the influence of gravity toward said molten layer with sufficient force to pass through said layer and thereby become encapsulated in a protective shell of said thermoplastic material, and to pass through the interface between said molten layer and the surface of said bath and downwardly into said lower zone of said liquid bath to harden the thermoplastic shell.

4. The method of claim 3 wherein said liquid droplets are maintained at a temperature approximately equal to the melting point of the thermoplastic layer.

5. The method of claim 3 in which force in addition to gravity is employed to cause said liquid particles to pass through said molten layer.

6. The method of claim 3 wherein the liquid droplets consist essentially of an amine hardening agent for epoxy resins, and said thermoplastic layer comprises a mixture of wax and polyethylene.

7. The method of claim 6 in which said thermoplastic layer also contains acid chloride for polymerizing the surface of said amine hardening agent.

References Cited in the file of this patent

UNITED STATES PATENTS

| | | |
|---|---|---|
| 1,378,084 | Bacon et al. | May 17, 1921 |
| 1,762,693 | Linebarger | June 10, 1930 |
| 2,339,114 | Scherer | Jan. 11, 1944 |
| 2,468,060 | Gunnell | Apr. 26, 1949 |
| 2,471,358 | Stephenson | May 24, 1949 |
| 2,574,357 | Stammer et al. | Nov. 6, 1951 |